United States Patent [19]

Hamblin et al.

[11] Patent Number: 5,033,847
[45] Date of Patent: Jul. 23, 1991

[54] ANGULAR POSITIONING AND CALIBRATION OF PROJECTED REFERENCE LIGHT PLANES

[75] Inventors: David L. Hamblin, New Carlisle; Edward E. Hart, Springfield, both of Ohio

[73] Assignee: Spectra-Physics, Inc., San Jose, Calif.

[21] Appl. No.: 462,653

[22] Filed: Jan. 9, 1990

[51] Int. Cl.⁵ .............................................. G01B 11/26
[52] U.S. Cl. ..................................... 356/138; 172/4.5; 356/152; 350/623
[58] Field of Search ................................ 356/138–143, 356/152, 248; 33/227, 290, DIG. 21; 350/623, 171, 172; 172/4.5; 37/DIG. 1, 20, 13, 14

[56] References Cited

U.S. PATENT DOCUMENTS

| 3,813,171 | 5/1974 | Teach et al. | 356/152 |
| 3,820,903 | 6/1974 | Kindl et al. | 356/138 |
| 4,031,629 | 6/1977 | Paluck | 33/290 |
| 4,035,084 | 7/1977 | Ramsay | 356/152 |
| 4,062,634 | 12/1977 | Rando et al. | 356/248 |
| 4,679,937 | 7/1987 | Cain et al. | 356/138 |
| 4,836,669 | 6/1989 | Teach | 350/618 |

Primary Examiner—F. L. Evans
Assistant Examiner—K. P. Hantis
Attorney, Agent, or Firm—Killworth, Gottman, Hagan & Schaeff

[57] ABSTRACT

A portion of first reference light plane is intercepted by a first one of a pair of angularly oriented reflective surfaces and reflected by the second of the pair of reflective surfaces as a second reference light plane at a selectable angle relative to the first reference light plane. The first and second reflective surfaces are movably mounted such that the first reflective surface can be rotated about a first axis coincident with or parallel to an incidence line in the first reflective surface which receives the first light plane and the second reflective surface can be rotated about a second axis parallel to but spaced from the first axis. The first and second reflective surfaces are mounted such that when the first reflective surface moves through an angle of a/2 degrees, the second reflective surface moves through an angle of a degrees. The first reflective surface is further mounted for rotation about a third axis coincident with or parallel to the first axis to vary the projection angle of the second reference light plane relative to the first reference light plane generator. Independent control of the rotational movement of the first reflective surface about the third axis serves to calibrate the pointing direction of the second light plane.

31 Claims, 3 Drawing Sheets

ANGULAR POSITIONING AND CALIBRATION OF PROJECTED REFERENCE LIGHT PLANES

BACKGROUND OF THE INVENTION

The present invention relates generally to the projection of light planes used in the construction industry and, more particularly, to a method and apparatus for the projection of first and second reference light planes which can be oriented at a selectable angle relative to one another. The second reference light plane is generated from the first light plane and is calibrated to be in alignment with a projection axis extending from the center of origin of the first light plane.

Reference light planes, typically using laser light, are employed in numerous surveying and construction applications. Such light planes can be projected throughout a work site to substantially continuously monitor and/or control the vertical height of an earth working tool, such as the blade of a motorgrader, in relation to the planes. Reference light planes can be generated by rotating laser beam devices, as disclosed in U.S. Pat. Nos. 4,062,634, 4,035,084 and 4,031,629, by a reflecting cone, as disclosed in U.S. Pat. Nos. 3,820,903 and 4,679,937 or by other appropriate devices.

In many mobile earth working machines, it is desirable to control not only the vertical height of working tools of the machines but also the direction of movement of the machines in relation, respectively, to predefined horizontal and vertical reference light planes. While this can be done by providing two of the devices disclosed in the above noted patents, preferably a pair of reference planes can be provided from a single light or laser source. For example, two orthogonal reference light planes are generated from a single laser source by the devices disclosed in U.S. Pat. Nos. 3,813,171 and 4,836,669. Such orthogonal reference light planes are indeed useful in many applications such as laying out a reference grid and other survey and control applications.

Oftentimes it is also desirable to be able to tilt the "horizontal" reference light plane such that an earth working machine, paving machine or the like can produce a grade angle on the surface which is being worked or formed with the grade angle being equal to the tilt of the horizontal plane. However, the vertical reference light plane should be maintained in a true vertical orientation regardless of any tilt of the horizontal light plane to best permit the monitoring and control functions which are performed relative to the vertical light plane. While it is common to construct reference light plane generators such that they can be tilted to correspond to desired grade angles, unfortunately, known devices for generating pairs of reference light planes from a single light or laser source are limited to generating planes which are oriented at fixed angles, usually substantially orthogonal, relative to one another or in any event, the angular orientation of the pairs of light planes is not readily adjustable.

Accordingly, there is a need for a reference light plane projector for generating two reference light planes which can be oriented at a selectable angle relative to one another. Preferably, the projector includes a calibration arrangement such that one of the reference planes o light can be calibrated to be in alignment with a projection axis extending from the center of origin of the other reference plane.

SUMMARY OF THE INVENTION

This need is met by the method and apparatus of the present invention wherein a portion of a first reference light plane is intercepted by a first one of a pair of angularly oriented reflective surfaces which can be mirrors, prisms or the like. The intercepted portion of the first light plane is reflected to the second of the pair of reflective surfaces from which it is reflected as a second reference light plane oriented at a selectable angle relative to the first reference light plane. The first and second reflective surfaces are movably mounted. The first reflective surface is mounted for rotation about a first axis coincident with or parallel to a line in the first reflective surface which receives the reflected portion of the first light plane, and the second reflective surface is mounted for rotation about a second axis parallel to but spaced from the first axis. The first and second reflective surfaces are mounted such that when the first reflective surface moves through an angle of a/2 degrees, the second reflective surface moves through an angle of a degrees. The method and apparatus of the present invention also include independent pivotal mounting and rotation of the first reflective surface about a third axis coincident with or parallel to the first axis to vary the projection angle of the second reference light plane relative to the first reference plane generator. Independent control of the rotational movement of the first reflective surface about the third axis provides a convenient procedure for calibrating the generation of the second reference light plane.

In accordance with one aspect of the present invention, apparatus for generating first and second reference light planes which are disposed at selectable angles relative to one another comprises light plane generator means for generating the first light plane. Reflective means made up of first and second reflective surfaces to intercept a portion of the first light plane and project that portion of the first light plane as the second light plane. The first reflective surface is positioned to intercept the portion of the first light plane along an incidence line in the first reflective surface and to reflect it to the second reflective surface from which it is reflected as the second light plane. Support means are provided for movably supporting the first and second reflective surfaces to select the relative angle between the first light plane and the second light plane.

The support means preferably comprises a first mounting member pivotably movable about a first axis coincident with or parallel to the incidence line for supporting the first reflective surface and a second mounting member pivotably movable about a second axis parallel to and spaced from the first axis for supporting the second reflective surface. Adjustment means are provided for moving the first and second mounting members such that when the first mounting member moves through an angle a/2 about the first axis, the second mounting member moves through an angle a about the second axis. The apparatus may further comprise calibration means for adjusting the angular orientation of the second light plane relative to an imaginary axis of origin of the second light plane.

The calibration means preferably comprises a third mounting member pivotably movable about a third axis coincident with or parallel to the first axis and calibration selection means for setting the angular orientation of the third mounting member relative to the third axis. For this preferred embodiment, the third mounting member is supported upon and pivotally movable relative to the first mounting member and supports the first reflective surface. The calibration selection means may comprise a set screw threadedly engaged with the third mounting member and extending toward the first mounting member, and first spring means for pivoting the third mounting member to a position about the third axis where the set screw engages the first mounting member, the angular orientation of the third mounting member about the third axis being determined by the positioning of the set screw. The first spring means may comprise a compression coil spring.

The first and second axes define a fixed plane and are spaced from one another in the fixed plane by a defined distance x and the second mounting member includes a slide member spaced a distance x from the second axis. The first mounting member is angularly oriented at an acute angle relative to the fixed plane and defines a slide surface for engaging the slide member of the second mounting member. Second spring means engage the first mounting member for resiliently biasing the slide surface into engagement with the slide member. The second spring means preferably comprises a flat leaf spring.

In accordance with another aspect of the present invention, apparatus for generating first and second reference light planes which are disposed at a defined angle relative to one another comprises light plane generator means for generating the first light plane. Reflective means made up of first and second reflective surfaces intercept a portion of the first light plane and project the intercepted portion of the first light plane as the second light plane. The first reflective surface is positioned to intercept the portion of the first light plane along an incidence line in the first reflective surface and reflect it to the second reflective surface from which it is reflected as the second light plane. Calibration means are provided for adjusting the angular orientation of the second light plane relative to an imaginary axis of origin of the second light plane.

The calibration means may comprise a mounting member pivotably movable about an axis coincident with or parallel to the incidence line for supporting the first reflective surface and calibration selection means for setting the angular orientation of the mounting member relative to the axis. The calibration selection means may comprise a set screw threadedly engaged with the mounting member for engaging a surface of the apparatus and spring means for pivoting the mounting member to a position about the axis where the set screw engages the surface, the angular orientation of the mounting member about the axis being determined by the positioning of the set screw. The spring means preferably comprises a compression coil spring.

In accordance with yet another aspect of the present invention, a method for generating first and second reference light planes which are disposed at selectable angles relative to one another comprises the steps of: generating the first light plane; positioning a first reflective surface to intercept a portion of the first light plane along an incidence line in the first reflective surface and reflect the portion of the first light plane to a second reflective surface which in turn reflects the portion of the first light plane as the second light plane; and, movably supporting the first and second reflective surfaces to select the relative angle between the first light plane and the second light plane.

The step of movably supporting the first and second reflective surfaces may comprise the steps of: supporting the first reflective surface on a first mounting member pivotably movable about a first axis coincident with or parallel to the incidence line; supporting the second reflective surface on a second mounting member pivotably movable about a second axis parallel to and spaced from the first axis; and, moving the first and second mounting members such that when the first mounting member is moved through an angle a/2 about the first axis, the second mounting member is moved through an angle a about the second axis. The method may further comprise the steps of: supporting the first reflective surface on a third mounting member pivotably movable about a third axis coincident with or parallel to the first axis; supporting the third mounting member upon the first mounting member such that the third mounting member is pivotally movable relative to the first mounting member; and, setting the angular orientation of the third mounting member relative to the third axis to calibrate the first and second reference light planes by adjusting the angular orientation of the second light plane relative to an imaginary axis of origin of the second light plane.

In accordance with still another aspect of the present invention, a method for generating first and second reference light planes which are disposed at a defined angle relative to one another comprises the steps of: generating the first light plane; positioning a first reflective surface to intercept a portion of the first light plane along an incidence line in the first reflective surface and reflect the portion of the first light plane to a second reflective surface which in turn reflects the portion of the first light plane as the second light plane; and, adjusting the angular orientation of the second light plane relative to an imaginary axis of origin of the second light plane to calibrate the first and second light planes. The step of adjusting the angular orientation of the second light plane relative to an imaginary axis of origin of the second light plane to calibrate the first and second light planes may comprise the steps of: supporting the first reflective surface on a mounting member pivotably movable about an axis coincident with or parallel to the incidence line; and, setting the angular orientation of the mounting member relative to the axis.

Additional aspects of the present invention provide methods and apparatus for generating a second light plane from a portion of a first light plane. The second light plane may be disposed at a selectable or defined angle relative to the first light plane and may be calibrated substantially as set forth above.

It is an object of the present invention to provide a method and apparatus for generating first and second reference light planes which are disposed at selectable angles relative to one another; to provide a method and apparatus for generating a second reference light plane from a first reference light plane with the second light plane disposed at selectable angles relative to the first light plane; to provide a method and apparatus for generating first and second reference light planes which are disposed at selectable angles relative to one another wherein a portion of a first reference plane is intercepted and reflected as a second reference plane at a selected angle relative to the first plane; to provide a method and apparatus for generating first and second reference light planes which are disposed at selectable angles or a defined angle relative to one another wherein the projection angle of the second reference light plane relative to the first reference plane generator can be selected for calibration of the reference planes; and, to provide a method and apparatus for generating first and second reference light planes which are disposed at selectable angles relative to one another wherein the angular orientation of the first and second planes relative to one another and the projection angle of the second reference plane relative to the first reference plane generator are selected by rotational movement of reflective surfaces which convert a portion of the first reference plane into the second reference plane.

Other objects and advantages of the invention will be apparent from the following description, the accompanying drawings and the appended claims.

DETAILED DESCRIPTION OF THE INVENTION

Figure 1:
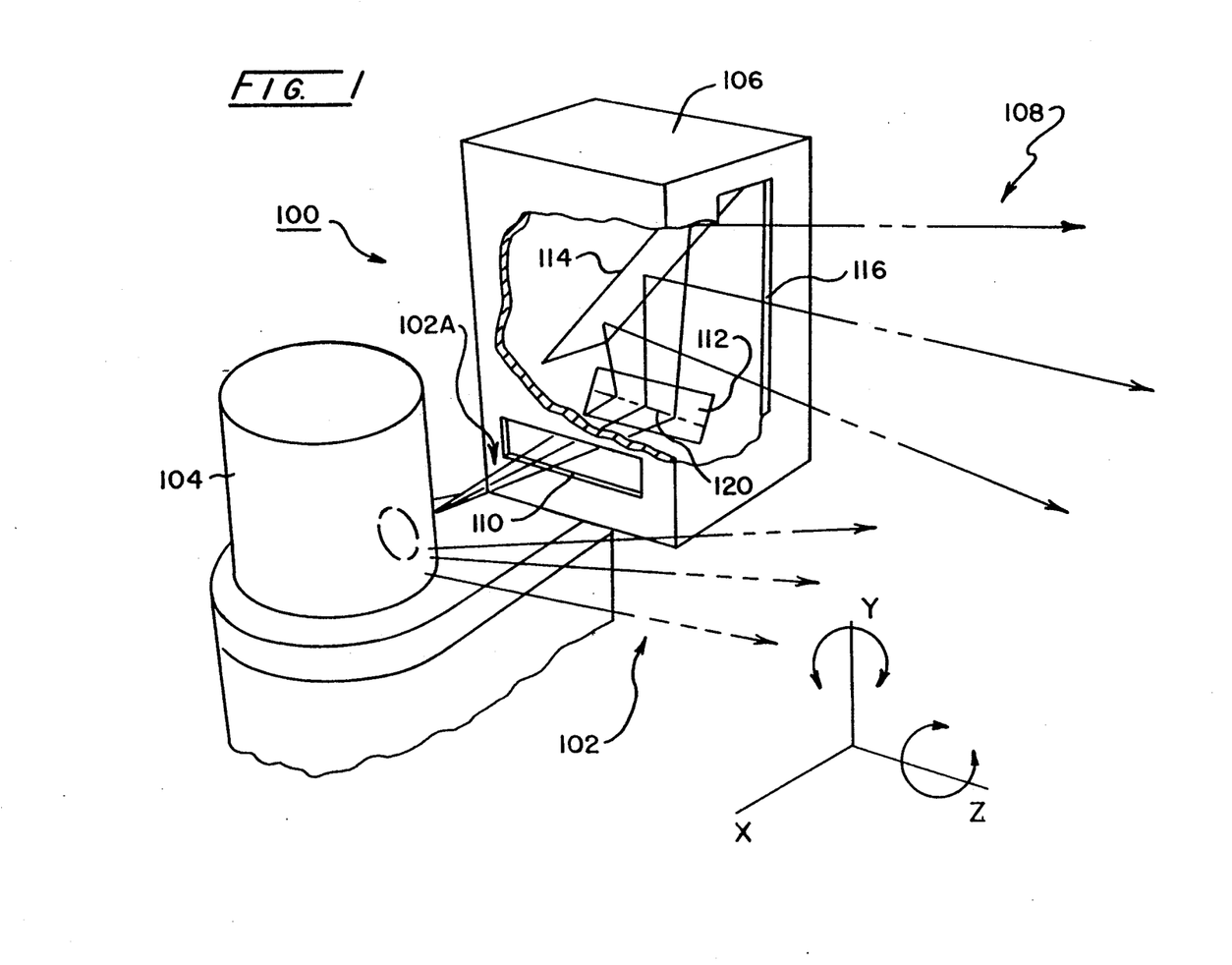
FIG. 1 is a perspective view of a dual reference plane generator.

A dual reference plane generator 100 is shown in FIG. 1 wherein a first reference light plane 102 is generated in the X-Z plane by a rotating laser beam device 104 as disclosed in U.S. Pat. Nos. 4,062,634, 4,035,084 and 4,031,629. A portion 102A of the light plane 102 is received by a reflective device 106 and redirected in the Y-Z plane as a second reference light plane 108. The portion 102A of the light plane 102 which is received or intercepted by the reflective device 106 enters the device 106 through a first window or opening 110.

The portion 102A of the light plane 102 is incident along an incidence line 120 on a first reflective surface 112 which is positioned at a 45° upwardly facing angle in the illustrated embodiment. The intercepted portion 102A of the light beam 102 is reflected to a second reflective surface 114. The second reflective surface 114 is positioned at an angle of 45° relative to the incidence line 120 and projects the intercepted portion 102A of the light plane 102 as the second light plane 108 through a second window or opening 116. It should be apparent that the reflective device 106 would function equally well with any source of a first reference light plane regardless of how the plane is generated.

While the dual reference plane generator 100 of FIG. 1 is very useful and economical in that two substantially orthogonal reference light planes are generated by a single light or laser source, if the generator 100 is tilted, for example about the Z-axis shown in FIG. 1, to place the light plane 102 or "horizontal" light plane at a desired grade angle, the second reference light plane 108 or vertical light plane is similarly tilted. In accordance with the present invention, the reflective surfaces 112 and 114 are mounted within the reflective device 106 as shown in FIGS. 2 and 3 to permit the second reference plane 108 to be easily returned to a substantially vertical orientation for monitoring and control operations within a work site utilizing the dual plane generator 100.

Figure 2:
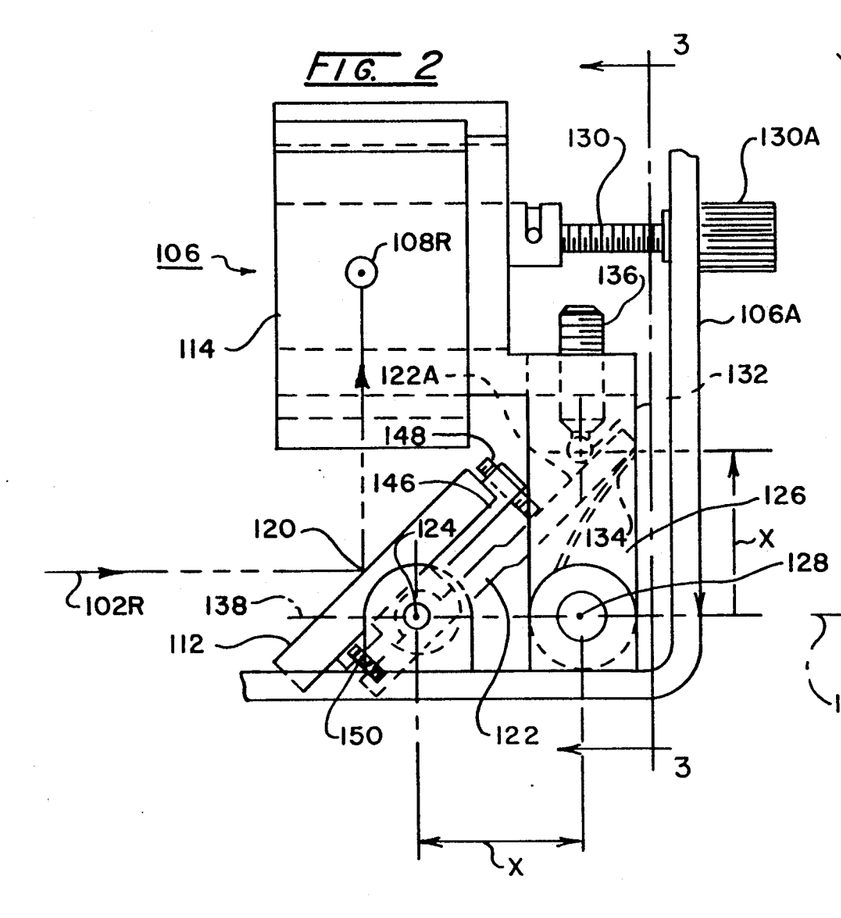
FIG. 2 is a front view of a reflective device in accordance with the present invention for generating a second light plane from a portion of a first light plane.
Figure 3:
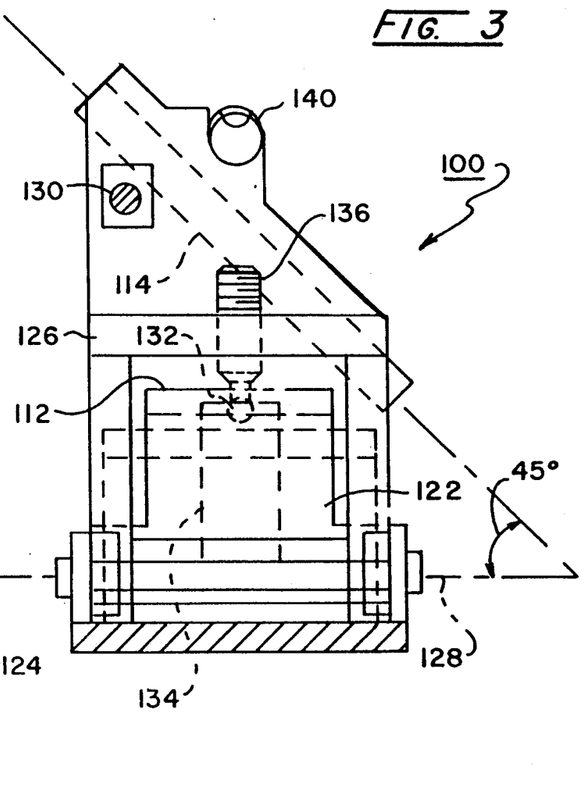
FIG. 3 is a side view of the reflective device of FIG. 2 taken in section along the section line 3—3.
Figure 4:
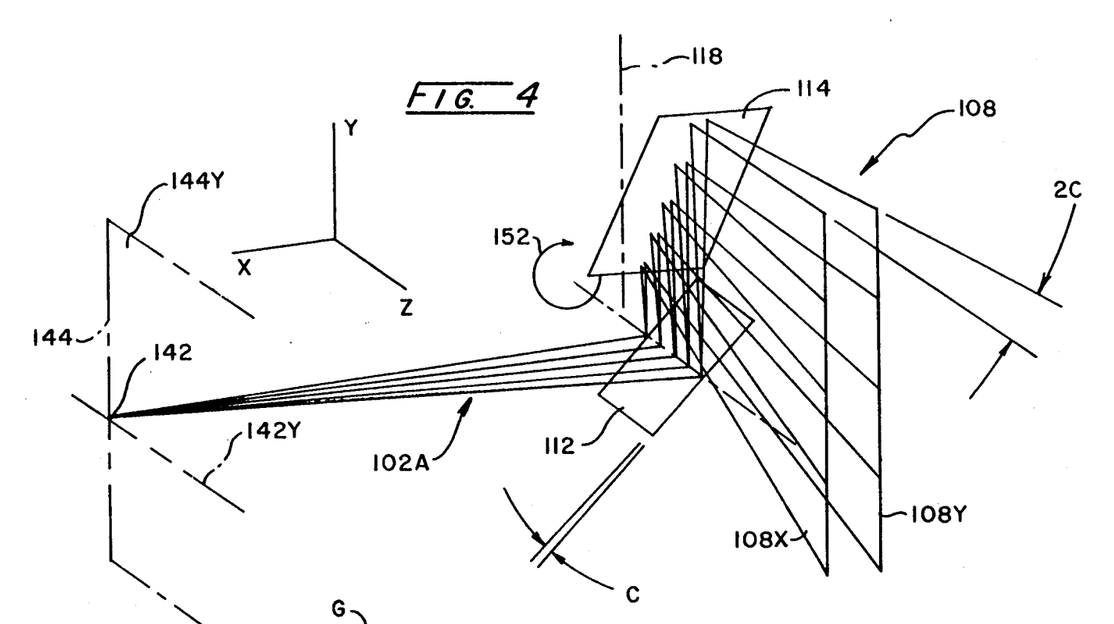
FIG. 4 illustrates calibration of the reflective device of FIGS. 2 and 3.

As shown in FIGS. 2 and 3, the reflective surface 112 is also mounted to permit calibration of the reflective device 106 such that the angular orientation of the second light plane 108 can be adjusted relative to or about an imaginary axis 118 from which the light plane 108 appears to originate, see FIG. 4. In this way, the orientation or pointing direction of the second light plane 108 relative to the dual reference plane generator 100 can be quickly and conveniently set or calibrated for utmost accuracy in monitoring and control functions performed using the second light plane 108. It is noted that some features of the invention have been omitted from one or the other of drawing FIGS. 2 and 3 for ease of illustration and description.

By mounting the reflective surfaces 112, 114 as shown in FIGS. 2 and 3, the reflective device 106 is converted into apparatus for generating the second reference light plane 108 at selectable angles relative to the first light plane 102. Thus, when the reflective device 106 of the present application is incorporated into the dual reference plane generator 100 of FIG. 1, it is converted into apparatus for generating first and second reference light planes 102, 108 which are disposed at selectable angles relative to one another.

As previously noted, light plane generator means may comprise the rotating laser beam device 104 or any other light plane generator which generates a first reference light plane such as the light plane 102. Reflective means, for example comprising the reflective device 106 as shown in FIGS. 2 and 3, is made up of the first and second reflective surfaces 112, 114 for intercepting the portion 102A of the first light plane 102 and projecting it as the second light plane 108. The first reflective surface 112 is positioned to intercept the portion 102A of the first light plane 102 along the incidence line 120 in the first reflective surface 112, see FIGS. 1 and 2, and reflect it to the second reflective surface 114 from which it is reflected as the second light plane 108.

Figure 5:
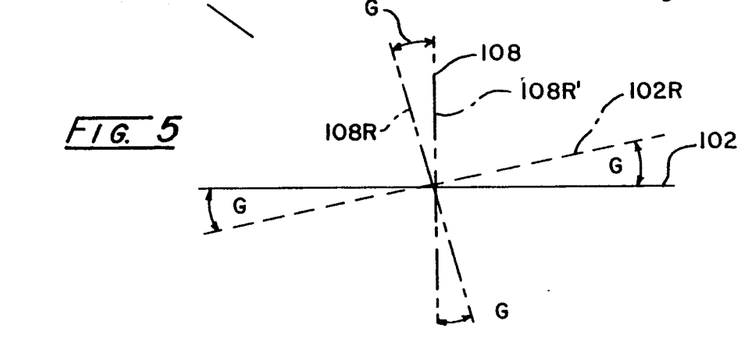
FIG. 5 illustrates vertical restoration of one of the reference planes generated by a dual reference plane generator including the present invention.

Support means is provided for movably supporting the first and second reflective surfaces 112, 114 to select the relative angle between the first light plane 102 and the second light plane 108. As shown in FIGS. 1 and 5, this angle is normally 90° with the first light plane 102 being substantially horizontal and the second light plane 108 substantially vertical. However, if the dual plane generator 100 is tilted to provide a rotated "horizontal" light plane 102R which defines a desired grade angle G relative to horizontal, the angle between the light planes must be varied if the second light plane 108 is to be substantially vertical. As shown in FIG. 5, if the generator 100 is rotated such that the light plane 102R is generated at a grade angle G, then the second light plane 108 is also rotated to the position of light plane 108R. For optimal utilization of the generator 100, the rotated light plane 108R must be restored to a substantially vertical orientation as the restored light plane 108R'.

To this end, the support means comprises a first mounting member 122 pivotably mounted for movement about a first axis 124 coincident with or parallel to the incidence line 120 for supporting the first reflective surface 112 and a second mounting member 126 pivotably mounted for movement about a second axis 128 parallel to and spaced from the first axis 124 for supporting the second reflective surface 114. Adjustment means comprising an adjustment screw 130 mounted to a housing 106A of the reflective device 106 and coupled to the second mounting member 126, provides for moving the first and second mounting members 122, 126.

The first mounting member 122 is coupled to the second mounting member 126 through a sliding engagement defined by a sliding surface 122A which is forced into engagement with a slide member 132 by spring means comprising a flat leaf spring 134 in the illustrated embodiment. The slide member 132 is a ball shaped terminal end of an adjustably positionable screw 136 which is threaded through a portion of the second mounting member 126. Thus, control of the adjustment screw 130 repositions the second mounting member 126 and thereby the first mounting member 122.

The first and second axes 124, 128 define a fixed plane 138 and are spaced from one another in the fixed plane 138 by a defined distance x. The center of the ball shaped slide member 132 which engages the sliding surface 122A is also spaced a distance x from the second axis 128. The first mounting member 122 is angularly oriented at an acute angle relative to the fixed plane 138 such that when the first mounting member 122 moves through an angle a/2 about the first axis 124, the second mounting member moves through an angle a about the second axis 128. In this way, the reflective surface 112 and the reflective surface 114 are moved to reposition the rotated light plane 108R to a substantially vertical orientation, i.e. to the position of the restored light plane 108R'.

The "half-angle" mechanism just described maintains the first and second mounting members 122, 126 in the proper orientation to project the second light plane 108 at an angle relative to the first light plane 102 which is selectable by rotation of the adjustment screw 130 by means of its knurled head 130A. The reflective surface 114 is always maintained at an angle of 45° relative to the incidence line 120 in the first reflective surface 112. Operation of the adjustment screw 130 to reposition the second light plane 108 to vertical, or other desired orientation, after the generator 100 has been tilted to define a desired grade angle, is facilitated by a level vial 140 which is mounted on the second mounting member 126 and is viewable through a window or opening (not shown) through the housing 106A.

As previously mentioned, the dual plane generator 100 can be calibrated such that the angular orientation of the second light plane 108 is adjusted relative to or about the imaginary axis 118 from which the light plane 108 appears to originate, see FIG. 4. The calibration referred to herein is to accurately orient the second light plane 108 relative to a plane or line which extends from the apparent origin 142 of the first light plane 102. The apparent origin 142 of the first light plane 102 is defined by the intersection of the axis 144 of the laser beam which is scanned by the rotating laser beam device or distributed by a reflective cone. Alternately, the origin of the first light plane can be arbitrarily selected. In any event, the second light plane 108 is to be oriented such that it is projected in parallel with a vertical plane containing the Z-axis and passing through the origin of the first light plane or a line within such a plane.

The calibration means for adjusting the angular orientation of the second light plane 108 relative to or about the imaginary axis 118 of origin of the second light plane 108 comprises a third mounting member 146 pivotably movable about a third axis. In the illustrated embodiment, the third axis is coincident with the first axis 124; however, it can be either coincident with or parallel to the first axis 124. Calibration selection means are provided for setting the angular orientation of the third mounting member 146 relative to the third axis which in this case is the same as the first axis 124. The third mounting member 146 is supported upon and pivotally movable relative to the first mounting member 122 and supports the first reflective surface 112.

In the illustrated embodiment, the calibration selection means comprises a set screw 148 which is threadedly engaged with the third mounting member 146 and extends toward the first mounting member 122 and first spring means comprising a compression coil spring 150 extending between the first and third mounting members 122, 146 for pivoting the third mounting member 146 to a position about the third axis (the first axis 124) where the set screw 148 engages the first mounting member 122, the angular orientation of the third mounting member 146 about the third axis (the first axis 124) being determined by the positioning of the set screw 148. Thus, the light plane 108 can be rotated about the axis 118 by adjusting the set screw 148 to calibrate the dual light plane generator 100 of the present invention.

As an example of calibration of the dual reference light plane generator 100, reference will now be made to FIG. 4. If the second light plane 108 is initially directed along a plane 108X shown in FIG. 4 but is to be projected in parallel with a plane 144Y or projection line 142Y, the set screw 148 is adjusted to rotate the third mounting member 146 about the third axis (the first axis 124) as indicated by the arrow 152 in FIG. 4. A rotation of C degrees about the third axis (the first axis 124) produces a rotation of 2C degrees of the second light plane 108 to a position directed along a plane 108Y which is parallel to the plane 144Y or the projection line 142Y. The set screw 148 is then secured in position to maintain the dual plane generator 100 in a calibrated condition.

The present invention further comprises a method for generating first and second reference light planes 102, 108 which are disposed at selectable angles relative to one another comprising the steps of: generating the first light plane 102; positioning a first reflective surface 112 to intercept a portion 102A of the first light Plane 102 along an incidence line 120 in the first reflective surface 112 and reflect the portion 102A of the first light plane 102 to a second reflective surface 114 which in turn reflects the portion 102A of the first light plane 102 as the second light plane 108; and movably supporting the first and second reflective surfaces 112, 114 to select the relative angle between the first light plane 102 and the second light plane 108.

The step of movably supporting the first and second reflective surfaces 112, 114 may comprise the steps of: supporting the first reflective surface 112 on a first mounting member 122 pivotably movable about a first axis 124 coincident with, or parallel to the incidence line 120; supporting the second reflective surface 114 on a second mounting member 126 pivotably movable about a second axis 128 parallel to and spaced from the first axis 124; and moving the first and second mounting members 122, 126 such that when the first mounting member 122 moves through an angle a/2 about the first axis 124, the second mounting member 126 moves through an angle a about the second axis 128.

The method may further comprise the steps of: supporting the first reflective surface 112 on a third mounting member 146 pivotably movable about a third axis coincident with or parallel to the first axis 124; supporting the third mounting member 146 upon the first mounting member 122 such that the third mounting member 146 is pivotally movable relative to the first mounting member 122; and setting the angular orientation of the third mounting member 146 relative to the third axis to calibrate the first and second reference light planes 102, 108 by adjusting the angular orientation of the second light plane 108 relative to the imaginary axis 118 of origin of the second light plane 108.

The present invention also contemplates a method for generating first and second reference light planes 102, 108 which are disposed at a defined angle relative to one another comprising the steps of: generating the first light plane 102; positioning a first reflective surface 112 to intercept a portion 102A of the first light plane 102 along an incidence line 120 in the first reflective surface 112 and reflect the portion 102A of the first light plane 102 to a second reflective surface 114 which in turn reflects the portion 102A of the first light plane 102 as the second light plane 108; and adjusting the angular orientation of the second light plane 108 relative to the imaginary axis 118 of origin of the second light plane 108 to calibrate the first and second light planes 102, 108. The step of adjusting the angular orientation of the second light plane 108 relative to the imaginary axis 118 of origin of the second light plane 108 to calibrate the first and second light planes 102, 108 may comprise the steps of: supporting the first reflective surface 112 on a mounting member 146 pivotably movable about an axis 124 coincident with or parallel to the incidence line 120; and setting the angular orientation of the mounting member 146 relative to the axis 124.

Having thus described the angular portioning and calibration of projected reference light planes of the present invention in detail and by reference to preferred embodiments thereof, it will be apparent that modifications and variations are possible without departing from the scope of the invention defined in the appended claims.

What is claimed is:

1. Apparatus for generating first and second reference light planes which are disposed at selectable angles relative to one another, said apparatus comprising:
   light plane generator means for generating said first light plane;
   reflective means comprising first and second reflective surfaces for intercepting a portion of said first light plane and projecting said portion of said first light plane as said second light plane, said first reflective surface being positioned to intercept said portion of said first light plane along an incidence line in said first reflective surface and reflect it to said second reflective surface from which it is reflected as said second light plane; and
   support means for movably supporting said first and second reflective surfaces to select the relative angle between said first light plane and said second light plane.

2. Apparatus for generating first and second reference light planes as claimed in claim 1 wherein said support means comprises:
   a first mounting member pivotably movable about a first axis coincident with or parallel to said incidence line for supporting said first reflective surface;
   a second mounting member pivotably movable about a second axis parallel to and spaced from said first axis for supporting said second reflective surface; and
   adjustment means for moving said first and second mounting members such that when said first mounting member moves through an angle a/2 about said first axis, said second mounting member moves through an angle a about said second axis.

3. Apparatus for generating first and second reference light planes as claimed in claim 2 further comprising calibration means for adjusting the angular orientation of said second light plane relative to an imaginary axis of origin of said second light plane.

4. Apparatus for generating first and second reference light planes as claimed in claim 3 wherein said calibration means comprises a third mounting member pivotably movable about a third axis coincident with or parallel to said first axis and calibration selection means for setting the angular orientation of said third mounting member relative to said third axis, said third mounting member being supported upon and pivotally movable relative to said first mounting member and supporting said first reflective surface.

5. Apparatus for generating first and second reference light planes as claimed in claim 4 wherein said calibration selection means comprises a set screw threadedly engaged with said third mounting member and extending toward said first mounting member, and first spring means for pivoting said third mounting member to a position about said third axis where said set screw engages said first mounting member, the angular orientation of said third mounting member about said third axis being determined by the positioning of said set screw.

6. Apparatus for generating first and second reference light planes as claimed in claim 5 wherein said first spring means comprises a compression coil spring.

7. Apparatus for generating first and second reference light planes as claimed in claim 6 wherein said first and second axes define a fixed plane and are spaced from one another in said fixed plane by a defined distance x, said second mounting member includes a slide member spaced a distance x from said second axis, said first mounting member is angularly oriented at an acute angle relative to said fixed plane and defines a slide surface for engaging said slide member of said second mounting member and second spring means engaging said first mounting member for resiliently biasing said slide surface into engagement with said slide member.

8. Apparatus for generating first and second reference light planes as claimed in claim 7 wherein said second spring means comprises a flat leaf spring.

9. Apparatus for generating first and second reference light planes which are disposed at a defined angle relative to one another, said apparatus comprising:
   light plane generator means for generating said first light plane;
   reflective means comprising first and second reflective surfaces for intercepting a portion of said first light plane and projecting said portion of said first light plane as said second light plane, said first reflective surface being positioned to intercept said portion of said first light plane along an incidence line in said first reflective surface and reflect it to said second reflective surface from which it is reflected as said second light plane; and
   calibration means for adjusting the angular orientation of said second light plane relative to an imaginary axis of origin of said second light plane.

10. Apparatus for generating first and second reference light planes as claimed in claim 9 wherein said calibration means comprises a mounting member pivotably movable about an axis coincident with or parallel to said incidence line for supporting said first reflective surface and calibration selection means for setting the angular orientation of said mounting member relative to said axis.

11. Apparatus for generating first and second reference light planes as claimed in claim 10 wherein said calibration selection means comprises a set screw threadedly engaged with said mounting member for engaging a surface of said apparatus and spring means for pivoting said mounting member to a position about said axis where said set screw engages said surface, the angular orientation of said mounting member about said axis being determined by the positioning of said set screw.

12. Apparatus for generating first and second reference light planes as claimed in claim 11 wherein said spring means comprises a compression coil spring.

13. A method for generating first and second reference light planes which are disposed at selectable angles relative to one another, said method comprising the steps of:
generating said first light plane;
positioning a first reflective surface to intercept a portion of said first light plane along an incidence line in said first reflective surface and reflect said portion of said first light plane to a second reflective surface which in turn reflects said portion of said first light plane as said second light plane; and
movably supporting said first and second reflective surfaces to select the relative angle between said first light plane and said second light plane.

14. A method for generating first and second reference light planes as claimed in claim 13 wherein the step of movably supporting said first and second reflective surfaces comprises the steps of:
supporting said first reflective surface on a first mounting member pivotably movable about a first axis coincident with or parallel to said incidence line;
supporting said second reflective surface on a second mounting member pivotably movable about a second axis parallel to and spaced from said first axis; and
moving said first and second mounting members such that when said first mounting member moves through an angle a/2 about said first axis, said second mounting member moves through an angle a about said second axis.

15. A method for generating first and second reference light planes as claimed in claim 14 further comprising the steps of:
supporting said first reflective surface on a third mounting member pivotably movable about a third axis coincident with or parallel to said first axis;
supporting said third mounting member upon said first mounting member such that said third mounting member is pivotally movable relative to said first mounting member; and
setting the angular orientation of said third mounting member relative to said third axis to calibrate the first and second reference light planes by adjusting the angular orientation of said second light plane relative to an imaginary axis of origin of said second light plane.

16. A method for generating first and second reference light planes which are disposed at a defined angle relative to one another, said method comprising the steps of:
generating said first light plane;
positioning a first reflective surface to intercept a portion of said first light plane along an incidence line in said first reflective surface and reflect said portion of said first light plane to a second reflective surface which in turn reflects said portion of said first light plane as said second light plane; and
adjusting the angular orientation of said second light plane relative to an imaginary axis of origin of said second light plane to calibrate said first and second light planes.

17. A method for generating first and second reference light planes as claimed in claim 16 wherein the step of adjusting the angular orientation of said second light plane relative to an imaginary axis of origin of said second light plane to calibrate said first and second light planes comprises the steps of:
supporting said first reflective surface on a mounting member pivotably movable about an axis coincident with or parallel to said incidence line; and
setting the angular orientation of said mounting member relative to said axis.

18. Apparatus for generating a second reference light plane from a first reference light plane, said second light plane being disposed at a selectable angle relative to said first light plane and said apparatus comprising:
reflective means comprising first and second reflective surfaces for intercepting a portion of said first light plane and projecting said portion of said first light plane as said second light plane, said first reflective surface being positioned to intercept said portion of said first light plane along an incidence line in said first reflective surface and reflect it to said second reflective surface from which it is reflected as said second light plane; and
support means for movably supporting said first and second reflective surfaces to select the relative angle between said first light plane and said second light plane.

19. Apparatus for generating a second reference light plane as claimed in claim 18 wherein said support means comprises: a first mounting member pivotably movable about a first axis coincident with or parallel to said incidence line for supporting said first reflective surface;
a second mounting member pivotably movable about a second axis parallel to and spaced from said first axis for supporting said second reflective surface; and
adjustment means for moving said first and second mounting members such that when said first mounting member moves through an angle a/2 about said first axis, said second mounting member moves through an angle a about said second axis.

20. Apparatus for generating a second reference light plane as claimed in claim 19 further comprising calibration means for adjusting the angular orientation of said second light plane relative to an imaginary axis of origin of said second light plane.

21. Apparatus for generating a second reference light plane as claimed in claim 20 wherein said calibration means comprises a third mounting member pivotably movable about a third axis coincident with or parallel to said first axis and calibration selection means for setting the angular orientation of said third mounting member relative to said third axis, said third mounting member being supported upon and pivotally movable relative to said first mounting member and supporting said first reflective surface.

22. Apparatus for generating a second reference light plane as claimed in claim 21 wherein said calibration selection means comprises a set screw threadedly engaged with said third mounting member and extending toward said first mounting member, and first spring means for pivoting said third mounting member to a position about said third axis where said set screw engages said first mounting member, the angular orientation of said third mounting member about said third axis being determined by the positioning of said set screw.

23. Apparatus for generating a second reference light plane as claimed in claim 22 wherein said first spring means comprises a compression coil spring.

24. Apparatus for generating a second reference light plane as claimed in claim 23 wherein said first and second axes define a fixed plane and are spaced from one another in said fixed plane by a defined distance x, said second mounting member includes a slide member spaced a distance x from said second axis, said first mounting member is angularly oriented at an acute angle relative to said fixed plane and defines a slide surface for engaging said slide member of said second mounting member and second spring means engaging said first mounting member for resiliently biasing said slide surface into engagement with said slide member.

25. Apparatus for generating a second reference light plane as claimed in claim 24 wherein said second spring means comprises a flat leaf spring.

26. Apparatus for generating a second reference light plane from a first reference light plane, said second light plane being disposed at a defined angle relative to said first light plane and said apparatus comprising:
reflective means comprising first and second reflective surfaces for intercepting a portion of said first light plane and projecting said portion of said first light plane as said second light plane, said first reflective surface being positioned to intercept said portion of said first light plane along an incidence line in said first reflective surface and reflect it to said second reflective surface from which it is reflected as said second light plane; and
calibration means for adjusting the angular orientation of said second light plane relative to an imaginary axis of origin of said second light plane.

27. Apparatus for generating a second reference light plane as claimed in claim 26 wherein said calibration means comprises a mounting member pivotably movable about an axis collinear with or parallel to said incidence line for supporting said first reflective surface and calibration selection means for setting the angular orientation of said mounting member relative to said axis.

28. Apparatus for generating a second reference light plane as claimed in claim 27 wherein said calibration selection means comprises a set screw threadedly engaged with said mounting member for engaging a surface of said apparatus and spring means for pivoting said mounting member to a position about said axis where said set screw engages said surface, the angular orientation of said mounting member about said axis being determined by the positioning of said set screw.

29. Apparatus for generating a second reference light plane as claimed in claim 28 wherein said spring means comprises a compression coil spring.

30. A method for generating a second reference light plane from a first reference light plane, said second light plane being disposed at a selectable angle relative to said first light plane and said method comprising the steps of:
positioning a first reflective surface to intercept a portion of said first light plane along an incidence line in said first reflective surface and reflect said portion of said first light plane to a second reflective surface;
positioning said second reflective surface to receive said portion of said first light plane and reflect said portion of said first light plane as said second light plane; and
movably supporting said first and second reflective surfaces to select the relative angle between said first light plane and said second light plane.

31. A method for generating a second reference light plane from a first reference light plane, said second light plane being disposed at a defined angle relative to said first light plane and said method comprising the steps of:
positioning a first reflective surface to intercept a portion of said first light plane along an incidence line in said first reflective surface and reflect said portion of said first light plane to a second reflective surface;
positioning said second reflective surface to receive said portion of said first light plane and reflect said portion of said first light plane as said second light plane; and
adjusting the angular orientation of said second light plane relative to an imaginary axis of origin of said second light plane to calibrate said first and second light planes.

* * * * *